United States Patent
Armellin et al.

(10) Patent No.: US 6,632,087 B1
(45) Date of Patent: Oct. 14, 2003

(54) INFRARED HEATING OVEN FOR THE CONDITIONING OF PLASTIC PREFORMS

(75) Inventors: Alberto Armellin, Vittorio Veneto (IT); Matteo Zoppas, Fontanafredda (IT)

(73) Assignee: Sipa S.P.A., Vittorio Veneto (IT)

( * ) Notice: Subject to any disclaimer, the term of this patent is extended or adjusted under 35 U.S.C. 154(b) by 0 days.

(21) Appl. No.: 10/149,025
(22) PCT Filed: Oct. 26, 2000
(86) PCT No.: PCT/EP00/10540
§ 371 (c)(1),
(2), (4) Date: Jun. 6, 2002
(87) PCT Pub. No.: WO01/49075
PCT Pub. Date: Jul. 5, 2001

(30) Foreign Application Priority Data

Dec. 23, 1999 (IT) .......................................... PN99A0100

(51) Int. Cl.⁷ .................................................. F27B 5/14
(52) U.S. Cl. .......................... 432/202; 432/201; 432/10; 425/526; 425/174.4
(58) Field of Search .............................. 432/5, 10, 201, 432/202, 224, 229; 264/454, 458, 520, 521; 425/526, 174.4

(56) References Cited

U.S. PATENT DOCUMENTS 4,606,723 A 8/1986 Pasternicki
5,322,651 A 6/1994 Emmer
5,714,109 A * 2/1998 Diller .......................... 264/454

FOREIGN PATENT DOCUMENTS

DE 2427611 A 12/1975
DE 19724621 A 12/1998

* cited by examiner

Primary Examiner—Jiping Lu
(74) Attorney, Agent, or Firm—Wenderoth, Lind & Ponack, L.L.P.

(57) ABSTRACT

Infrared oven for heating a plurality of preforms and comprising: a conduit through which said preforms move, a flow of outside air that flows through said conduit from an intake mouth to an exhaust mouth under the action of a blower, a plurality of infrared lamps irradiating the preforms in said conduit, in which a reflective surface is arranged downstream of said lamps and is provided with apertures through which the flow of outside air passes prevailingly. The axis of the preforms is oriented in a manner that is substantially perpendicular to the direction of flow of said outside air. The infrared lamps are arranged substantially downstream of the preforms, and are separated from each other by appropriate intervals through which said flow of outside air passes, in which said flow of outside air first passes through said intervals separating said preforms and then through said intervals provided between said infrared lamps. A reflective grid, provided with apertures for the flow of outside air to partially pass therethrough, is arranged upstream of said preforms.

20 Claims, 1 Drawing Sheet

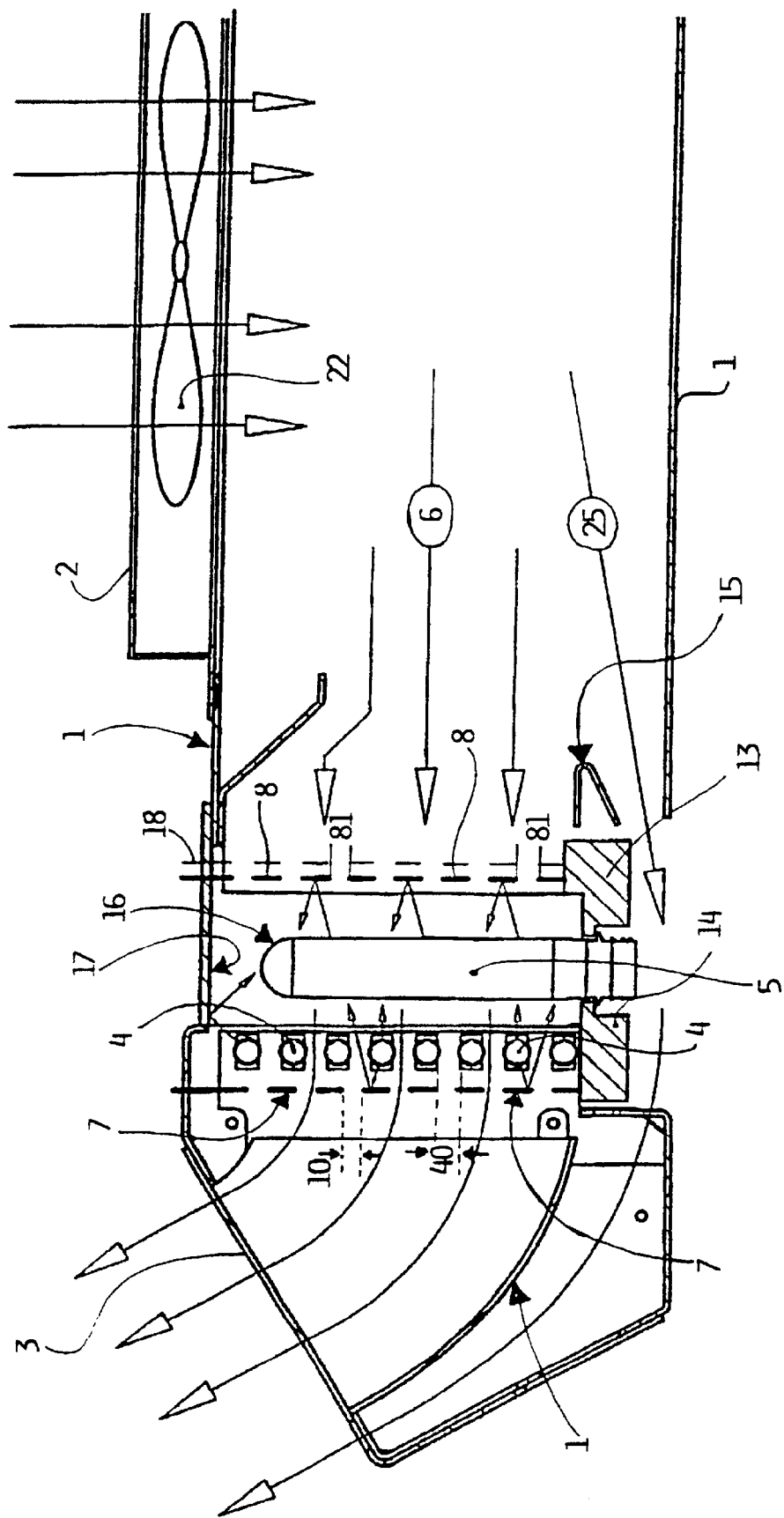

INFRARED HEATING OVEN FOR THE CONDITIONING OF PLASTIC PREFORMS

DESCRIPTION

The present invention refers to an improved infrared heating oven for conditioning individual items moving substantially in a continuous manner and in an aligned arrangement inside said oven. In particular, the present invention applies preferentially to moulding machines capable of moulding at the same time a plurality of plastic items, which are generally known as "preforms" in the art and are intended for subsequent blow-moulding into appropriate Final containers, especially plastic bottles.

The machines used to mould the final products, ie. to blow mould said preforms into said final containers, are usually defined as "single-stage machines", since they are capable of carrying out the whole process needed to convert the raw plastic material from the pelletized form in which it is fed to the machine, into the finished product, ie. said final containers.

However, to the purposes of the present invention, also machines used to only convert previously moulded preforms into final containers can be considered as single-stage machines, since the blow moulding process must anyway be preceded by a phase of temperature conditioning of the preforms, ie. the phase that is exactly the subject covered by the present invention.

The difference existing between single-stage and two-stage machines in this particular field is well-known to all those skilled in the art, so that it shall not be explained here any further.

For reasons of greater convenience, all those who may have an interest in this connection should refer to the patent application PCT/EP98/08380 and the patent EP 0 768 165 of this same Applicant.

It is a generally known fact in the art that, before going on through the actual blow moulding process, preforms are heated up to an optimum predefined temperature for blow moulding, and this is usually carried out in appropriate conditioning ovens that make use of infrared lamps as heating means.

The neck portion of said preforms must anyway remain cold, ie. at a lower temperature than the glass transition temperature, so that the subsequent blow moulding operations will not cause it to distort.

Also well-known is the fact that the heating of the body of the preforms is obtained by the combined effect of:
  the infrared radiation penetrating the thickness of the body of the preform (convection),
  the contact with the heated ambient air of the interior of the oven (conduction), and
  heat diffusion by inner conduction in the wall of the preform (thermal stabilization/inversion).

It is a commonly felt need for the interior of the oven and the outer surface of the preforms arranged therein to be ventilated with a flow of air at a pre-established, anyway relatively low temperature, so that the material lying on the outer surface of the preforms is prevented from being brought up to an excessively high temperature that would cause it to crystallize, while waiting for the material lying inside the preforms to reach the required blow-moulding temperature.

Such a ventilation enables the ambient temperature inside the oven to be kept at a desirable level, while eliminating any excessive heat due to infrared rays that fail to be captured, ie. retained by the preforms themselves, as well as the "skin" temperature of the preforms to be mitigated.

Such a desirable level of the internal temperature of the oven is the one that actually enables the energy efficiency of the oven to be optimized. It is in fact a largely known point that it is a function of the thickness of the preforms.

The ventilation of the oven must be carried out at an adequate flow rate in view of being able to satisfactorily perform such a function, and it is desirable that the ventilation itself is well distributed all over the interior of the oven in such a manner as to ensure that the whole surface of the wall of the preform, which must be heated up, is actually treated in an even, homogeneous manner.

It is also necessary for the ventilating air, which is heated up as it flows through the oven, to avoid to touch, ie. flow over the neck of the preforms, which on the contrary should remain as cold as possible.

This problem of being able to ensure a well-balanced heating of the preforms, without anyway involving the neck portion thereof, has been the subject of a number of investigation and research works, as well as a corresponding number of proposed solutions, as documented by the various existing prior-art patent publications covering this matter, among which the following ones are cited here:

U.S. Pat. No. 5,256,341 in the name of SIDEL; according to this document, the heating of the preforms is obtained both directly and indirectly by making use of the reflective properties of a core that is placed inside each single preform during the temperature conditioning operation. This solution certainly provides some advantages as far energy efficiency is concerned, but involves considerable construction and operating complications connected with the need for said cores to be handled and driven in a synchronized manner; furthermore, the ability to comply with the above cited requirement calling for the neck portion of the preforms to be as far as possible guarded against heating is not adequately ensured.

U.S. Pat. No. 4,923,395 in the name of HUSKY INJECTION MOLDING SYSTEMS LTD. discloses a solution according to which a kind of heating action is provided which is aimed at, ie. focussed on the preforms themselves by means of a variable positioning of the battery of heating elements, in such a manner as to generate a flow of infrared radiation that exactly corresponds to the peculiar requirements arising in connection with each particular type of preforms being handled (thickness, material, outer dimensions and so on). However, this solution proves quite difficult to be implemented from a practical point of view, owing to the really considerable contraindications of a construction-related and operating nature arising also in view of being able to avoid irradiating the necks of the preforms, and the high costs that are generally connected thereto.

U.S. Pat. No. 5,066,222 to BEKUM MASCHINENFABRIK GmbH discloses in turn the solution consisting in spacing the preforms from each other as they move through the oven along the heating lamps, as well as protecting the neck portion of the same preforms with the use of thermally insulating sheaths capable of being removed after the temperature conditioning operation. However, this solution appears to anyway share some peculiarities and features with the above described one, so that it maintains and confirms definite construction-related and operating contraindications, as well as a related significant extent of associated costs.

U.S. Pat. No. 4,606,723 to SIDEL: this solution has a number of technical drawbacks that may be summarized as follows:

a) in the first place, the flow of cooling air only marginally passes over, ie. touches the lamps to cool them down, so that the need actually arises for the rate of the same flow to be correspondingly increased, thereby bringing however about the problem connected with the preforms that are not exposed to the heating radiations undergoing actually to an excessive cooling down;

b) in the second place, the bottom of the preform, ie. the closed portion opposing the neck thereof, fails to be irradiated by the upper lamp to any adequate extent, so that it undergoes an uncertain, generally unsatisfactory heating effect; if the number of these lamps is going to be increased in view of doing away with such a problem, this would on the other hand give rise to other problems, since the lamps themselves would in this case be exposed to a greater extent to the flow of cooling air and, therefore, would show different radiating characteristics;

c) owing to the asymmetry of the oven construction and the circulation of the air flow, the preforms, owing to them being invested by the air in a longitudinal downward direction, ie. from top to bottom, and not in a crosswise direction, would be conditioned in an inhomogeneous and, therefore, incorrect manner;

d) finally, in the described solution there is practically no possibility whatsoever for the sockets of the heating elements to be cooled down by the same flow of air used to cool down the body of the preforms; however, since these sockets anyway require to be cooled down in a rather intensive manner, the need therefore arises for a special cooling system to be provided and this of course leads to a greater complexity in the construction of the plant and correspondingly higher costs.

U.S. Pat. No. 5,322,651 to SIDEL SA teaches to heat up in a controlled manner a plurality of preforms cooled down by means of a flow of air whose temperature is controlled owing to it being the result of the air exhausted from the oven being mixed with fresh outside air, in such a manner as to obtain cooling air at always the same temperature. This solution, however, refers, as far as other technical and functional aspects of the matter are concerned, to substantially the same architecture and operating criteria illustrated in the afore cited patent publication, so that it is unavoidably associated to the same kind of drawbacks illustrated in connection with the afore mentioned solution.

Furthermore, it seems at this point quite appropriate for a rather simple, although important consideration to be made: in order to obtain a rather constant flow of cooling air, the need arises for the related conduit to have a cross-section area that is as large as possible.

On the contrary, in order to achieve a satisfactory reflection of the infrared-ray radiation by the walls of the same conduit towards the preform contained therein, the need arises for the conduit itself to have, at least in the zone lying close to the preforms, a very narrow cross-section area.

Therefore, between these clashing requirements there is an obvious contrast, which does not seem to have been done away with to any satisfactory extent by any of the prior-art solutions.

Based on the above considerations, it is therefore a main purpose of the present invention to provide a preform conditioning oven that is free from the afore described drawbacks, and is further reliable, capable of being implemented in a simple manner using readily available techniques and materials, and is capable of solving by a satisfactory compromise the antagonistic requirements of a constant air flow and an adequate reflection efficiency of the inner walls of the conduit.

Such an main of the present invention, along with further features thereof, is reached in an oven that is made and operates as recited in the appended claims.

The present invention may take the form of a preferred, although not sole embodiment such as the one that is described in detail and illustrated below by way of non-limiting example with reference to single accompanying drawing, which is a vertical cross-sectional view of a portion of an oven according to the present invention, as illustrated in a symbolical manner.

A heating and conditioning oven according to the present invention is essentially comprised of:

a conduit 1, into which the cooling air is blown and through which the preforms 5 are caused to move in a direction that is substantially transversal with respect to the flow 6 of said cooling air, said conduit being also provided with:

an intake inlet 2 for said cooling air, an exhaust aperture 3 for said cooling air, a battery of heating lamps 4, a reflective wall 7, arranged downstream of said heating lamps, a front grid 8 provided with apertures 81 for said flow of air to pass therethrough and move towards and against said preforms, a blower 22 adapted to take in fresh air through said intake inlet and blow it into said conduit in the direction of said preforms and said front grid 8.

According to a preferred embodiment of the invention, the front grid 8, the battery of lamps 4 and the reflective wall 7 are arranged each on a respective plane, and all these respective planes are substantially parallel to the plane on which said preforms are caused to move along inside said conduit and transversally with respect to the latter.

In particular, in view of achieving a more balanced and homogeneous heating of the preforms, it is required that at least the plane on which said preforms move along and the plane of the lamps be parallel to each other.

The reflective wall 7 must furthermore be provided with a plurality of apertures 10, and the heating lamps 4 must be separated from each other by appropriate gaps or intervals 40, so that the passage of the cooling air therethrough is advantageously promoted. After so flowing over and touching said lamps 4, said air flow, as it moves further on towards the exhaust aperture 3, reaches said reflective wall 7 and, filtering through said apertures 10, moves beyond them and away towards the exhaust aperture 3.

The present invention allows for a number of possible improvements. A first one of such improvements relates to the cooling of the neck portion of the preforms. Since, as this has already been mentioned earlier in this description, such a neck portion should not be heated up, in order to avert such a possibility it is appropriate for the preforms to therefore be arranged and oriented with the neck portion thereof facing downwards and, as a result, with the bottom portion of the body thereof facing of course upwards.

However, in order to avoid that even a slight portion of the infrared radiation, as reflected by said front grid 8, may reach and, therefore, heat up the neck portions of said preforms, it has been found advantageous for a preferably horizontal separating baffle plate 13 to be provided there, wherein said baffle plate 13 is so sized and arranged as to be able to intercept and stop those radiations that are reflected by said grid 8 and are directed downwards, ie. towards the zone of the neck portions of the preforms.

All the more so, provision is advantageously made on the rear side of the preforms, and at an height corresponding to the annulus or outstanding ring of the preforms, of a second baffle plate 14 arranged so as to be able to intercept the infrared radiation that, as issuing directly from said lamps, is directed towards the neck portions of the preforms.

In all cases, being it desirable that the neck portion of the preforms be capable of remaining as cold as possible, it is advantageous for said conduit to be able to contain said preforms over its whole height, while means 15 are provided there so as to be adapted to divert a part 25 of the cooling air flow directly against and beyond said neck portions, wherein said air is by no way involved by the heating action of said lamps.

Furthermore, the same flow of cooling air that hits the body of the preforms, and that therefore moves through the heating lamps, is capable of being used to cool down also the sockets (not shown) of said lamps, without any need therefore arising for a special, different air flow to be additionally provided to this purpose, as this on the contrary occurs in prior-art solutions.

In order to further ensure that also the bottom portion 16 of the preforms is properly heated up, it has been found advantageous for a further reflective wall 17 to be arranged between the inner wall of the conduit facing said bottom portions of the preforms moving therethrough and the bottom portions themselves, wherein this further reflective wall 17 is adapted to reflect the infrared radiation issued by said lamps 4, so as to ensure that the radiation so reflected by said wall 17 is capable to hit said bottom portions 16 of the preforms moving therethrough.

In addition, in order to enable the air flow to be adjustable as far as both the flow rate and the distribution pattern thereof towards said preforms are concerned, said conduit is provided, in correspondence of the attachment perimeter of said grid 8, with appropriate lock-in slits 18, so that said grid is easily interchangeable with other grids having different characteristics, but being similarly capable of engaging said lock-in slits 18.

Under operating conditions, the preforms are continuously and regularly caused to rotate about their respective axis. This actually enable successive portions of the body thereof to be directly irradiated by the lamps, which heat them up, while other portions, opposite thereto, are cooled down, thereby enabling heat to propagate through and into the thickness of the wall of the preforms, so as to attain in a balanced and gradual manner a uniform temperature throughout the body of the preforms, including the bottom portion thereof, while never reaching up to excessive temperatures, thanks to the cooling action ensured by said continuous flow of air.

Anyone skilled in the art will at this point be capable of realizing the various advantages that may be achieved with the present invention and the improvements thereof:

by letting the air flow through the lamps, the possibility is obtained for the completely reflective wall 17 to be used above the bottom portions of the preforms, while however maintaining adequate passages for ventilation and ensuring the capability of most efficiently using the radiation issued by the lamps;

a flow of cooling air can be defined to solely involve the neck portions of the preforms, without it being affected by the heating action of the lamps at all and, as a result, without it being in turn capable of heating up said neck portions;

the flow of cooling air is orthogonal to the plane on which the preforms move along and this ensures a great extent of uniformity in the cooling effect; furthermore, also the plane of the lamps lies parallel to the plane of the preforms, and these two particular circumstances, when combined with each other, ensure a maximum extent of uniformity in conditioning the preforms;

the flow of cooling air enters the conduit from the side thereof which is opposed to the heating lamps, so that it only passes through said lamps when it is coming near the exhaust aperture; this is instrumental in obtaining an overall cooler oven than the traditional ones, as well as a more efficient cooling of the preforms, thereby favouring a quicker conditioning process;

thanks to the variability of the apertures of the grid 8, the possibility is given for the flow rate of the preform cooling air to be adjusted in accordance with the various product-related and/or process-related requirements, without anyway involving or affecting the flow of cooling air provided for the neck portions of the preforms, said flow of cooling air being in fact directed towards said neck portions without it being by any means subject to or affected by the position and the characteristics of the apertures in said grid;

finally, the circumstance that the air intake inlet 2 is oriented upwards favours the inflow of fresh air, which tends to spontaneously move downwards, while the circumstance that also the axhaust port 3 is oriented upwards again favours the ejection of the hot air, owing to the well-known "stack effect".

These circumstances, when combined together, promote the natural circulation of the cooling air which, by adding up to the forced circulation brought about by the blower 22, boosts the effects thereof.

What is claimed is:

1. Infrared oven, adapted to heat up a plurality of preforms, comprising:

a conduit in which said preforms are caused to move through in an orderly sequence, a flow of air that is taken in from the outside and is caused to flow in a forced manner along said conduit, from an intake mouth through to an exhaust mouth thereof, by means of a blower, characterized in that a reflective surface is arranged downstream of said infrared lamps, said surface being provided with a multiplicity of apertures adapted to let said flow of outside air to pass in a substantial manner therethrough.

2. Oven according to claim 1, characterized in that said preforms have their respective axes oriented in a substantially perpendicular manner to the direction of flow of said outside air.

3. Oven according to claim 2, characterized in that said infrared lamps are separated from each other by appropriate intervals, through which said flow of outside air is capable of passing, and that said flow of outside air is adapted to first flow through the intervals separating said preforms from each other and then through said intervals between said infrared lamps.

4. Oven according to claim 3, characterized in that a reflective grid, provided with apertures adapted to let at least a part of said flow of outside air to pass therethrough, is arranged upstream of said preforms.

5. Oven according to claim 4, characterized in that there are provided, on the inner edge of said conduit, appropriate means, preferably lock-in slits, adapted to selectively accommodate a plurality of said grids having different characteristics with respect to the passage of said flow of air therethrough.

6. Oven according to claim 3, characterized in that there are provided, on an inner edge of said conduit, appropriate means, preferably lock-in slits, adapted to selectively accommodate a plurality of said grids having different characteristics with respect to the passage of said flow of air therethrough.

7. Oven according to claim 2, characterized in that said infrared lamps are arranged substantially downstream of said preforms with respect to the moving direction of said flow of outside air.

8. Oven according to claim 7, characterized in that there are provided, an inner edge of said conduit, appropriate means, preferably lock-in slits, adapted to selectively accommodate a plurality of said grids having different characteristics with respect to the passage of said flow of air therethrough.

9. Oven according to claim 2, characterized in that there are provided, on an inner edge of said conduit, appropriate means, preferably lock-in slits, adapted to selectively accommodate a plurality of said grids having different characteristics with respect to the passage of said flow of air therethrough.

10. Oven according to claim 1, characterized in that said infrared lamps are arranged substantially downstream of said preforms with respect to the moving direction of said flow of outside air.

11. Oven according to claim 3, characterized in that there are provided, on an inner edge of said conduit, appropriate means, preferably lock-in slits, adapted to selectively accommodate a plurality of said grids having different characteristics with respect to the passage of said flow of air therethrough.

12. Oven according to claim 1, characterized in that there are provided, on an inner edge of said conduit, appropriate means, preferably lock-in slits, adapted to selectively accommodate a plurality of said grids having different characteristics with respect to the passage of said flow of air therethrough.

13. Oven according to claim 1, characterized in that there are provided separation means, preferably horizontal insulating baffle plates, adapted to protect the neck portions of respective preforms against the radiation reflected by said grid.

14. Oven according to claim 1, characterized in that there are provided further means adapted to intercept the infrared radiation issued directly by said infrared lamps, wherein said further means are arranged between said lamps and the zone of the neck portions of respective preforms.

15. Oven according to claim 1, characterized in that there are provided means adapted to at least partially divert said flow of outside air and direct it towards the neck portions of respective preforms.

16. Oven according to claim 1, characterized in that said preforms are arranged, as they move along said conduit, with respective bottom portions turned upwards, and that there are provided, inside said conduit, suitable reflective surfaces adapted to reflect infrared radiation emitted by said infrared lamps towards said bottom portions of the respective preforms.

17. Oven according to claim 16, characterized in that said reflective surface and said front grid are arranged on respective planes, which are parallel to the plane on which said preforms move along in said conduit.

18. Oven according to claim 1, characterized in that the flow of said cooling air, which hits and cools down said infrared lamps, is adapted to also cool down, at least with a portion thereof, sockets supporting and energizing said infrared lamps.

19. Oven according to claim 1, characterized in that said air intake mouth and said air exhaust mouth are substantially facing upwards.

20. Oven according to claim 2, characterized in that there are provided separation means, preferably horizontal insulating baffle plates, adapted to protect the neck portions of respective preforms against radiation reflected by said grid.

* * * * *